United States Patent
Kim

(10) Patent No.: US 9,478,833 B2
(45) Date of Patent: Oct. 25, 2016

(54) SECONDARY BATTERY WITH A HEAT SHRINKABLE INSULATION MEMBER

(71) Applicant: Samsung SDI Co., Ltd., Yongin-si, Gyeonggi-do (KR)

(72) Inventor: Daekyu Kim, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 460 days.

(21) Appl. No.: 13/833,071

(22) Filed: Mar. 15, 2013

(65) Prior Publication Data

US 2014/0065471 A1 Mar. 6, 2014

(30) Foreign Application Priority Data

Aug. 28, 2012 (KR) ........................ 10-2012-0094327

(51) Int. Cl.
*H01M 2/08* (2006.01)
*H01M 10/658* (2014.01)
*H01M 2/12* (2006.01)
*H01M 2/34* (2006.01)

(52) U.S. Cl.
CPC ........... *H01M 10/5087* (2013.01); *H01M 2/08* (2013.01); *H01M 2/1282* (2013.01); *H01M 2/348* (2013.01); *H01M 10/658* (2015.04)

(58) Field of Classification Search
CPC .... H01M 2/048; H01M 2/0478; H01M 2/08; H01M 2/0456; H01M 2/1282; H01M 2/348; H01M 10/5087; H01M 10/5034; Y02E 60/12
See application file for complete search history.

(56) References Cited

U.S. PATENT DOCUMENTS

| 2011/0039151 | A1 | 2/2011 | Mitchell |
| 2011/0076549 | A1 | 3/2011 | Kim |
| 2011/0117421 | A1* | 5/2011 | Kim et al. ..................... 429/163 |
| 2012/0028094 | A1 | 2/2012 | Kim et al. |
| 2012/0225331 | A1 | 9/2012 | Tartaglia |

FOREIGN PATENT DOCUMENTS

| JP | 2009-302019 | 12/2009 |
| KR | 10-2011-0035484 | 4/2011 |

* cited by examiner

*Primary Examiner* — Raymond Alejandro
(74) *Attorney, Agent, or Firm* — Robert E. Bushnell, Esq.

(57) ABSTRACT

A secondary battery that includes a can, an electrode assembly accommodated in the can together with an electrolytic solution, a cap assembly sealing, the can, and an insulation member. The insulation member is interposed between the electrode assembly and the cap assembly. The insulation member includes a heat shrinkable material. The insulation member is contained within the can and in direct physical contact with an end of the electrode assembly.

12 Claims, 6 Drawing Sheets

SECONDARY BATTERY WITH A HEAT SHRINKABLE INSULATION MEMBER

CLAIM PRIORITY

This application makes reference to, incorporates the same herein, and claims all benefits accruing under 35 U.S.C. §119 from an application earlier filed in the Korean Intellectual Property Office on 28 Aug. 2012 and there duly assigned Serial No. 10-2012-0094327.

BACKGROUND OF THE INVENTION

1. Field of the Invention

Aspects of the present invention generally relate to a secondary battery.

2. Description of the Related Art

Owing to various advantages, including a high operating voltage and high energy density per unit weight, lithium ion secondary batteries are used as power sources for portable electronic devices as well as motor-driving power source for hybrid electric vehicles.

The above information disclosed in this Related Art section is only for enhancement of understanding of the background of the invention and therefore it may contain information that does not form the prior art that is already known to a person of ordinary skill in the art.

SUMMARY OF THE INVENTION

Embodiments of the present invention provide a secondary battery, which can minimize an increase in the cell temperature while securing a gas moving space in the battery such that an insulation member is thermally shrunk when battery abnormality, such as an over-charge or internal short circuit, occurs.

According to an embodiment of the present invention, there is provided a secondary battery including a can, an electrode assembly accommodated in the can together with an electrolytic solution, a cap assembly sealing the can, and an insulation member interposed between the electrode assembly and the cap assembly, wherein the insulation member may include a heat shrinkable material.

During shrinkage of the insulation member, the insulation member may shrink in a first direction, a second direction, a third direction and a fourth direction, which are centrally directed to the insulation member, shrinkage rates for the first direction and the second direction may be higher than those for the third direction and the fourth direction, the first direction and the second direction are opposite to each other, the third direction and the fourth direction may be opposite to each other, and the first direction and the second direction may be perpendicular to the third direction and the fourth direction.

In addition, during shrinkage of the insulation member, the insulation member may shrink in the first direction and the second direction to have a reduced planar area by at least 90% based on a total planar area of the insulation member and shrinks in the third direction and the fourth direction to have a reduced planar area by at least 10% based on the total planar area of the insulation member.

The insulation member may include at least one of a polyethylene terephthalate (PET) heat shrinkable film, a polypropylene (PP) heat shrinkable film, and an oriented polystyrene (OPS) heat shrinkable film.

In addition, the insulation member may have a thickness of 0.3 to 0.5 mm.

The insulation member may be melted at a temperature in the range of 145° C. to 152° C. to then shrink.

The insulation member may shrink by heat in a predetermined temperature range to have a reduced planar area by 10 to 90%.

The insulation member may be an upper insulation member, a lower insulation member may further be provided between the electrode assembly and a bottom part of the can, the lower insulation member made of a heat shrinkable material and shrinking by heat in a predetermined temperature range to have a reduced planar area by 10 to 90%.

The lower insulation member may include at least one of a polyethylene terephthalate (PET) heat shrinkable film, a polypropylene (PP) heat shrinkable film, and an oriented polystyrene (OPS) heat shrinkable film.

The secondary battery may be a cylindrical secondary battery.

According to another embodiment of the present invention, an insulation member is provided, including a can; and an electrode assembly accommodated in the can together with an electrolytic solution and a cap assembly sealing the can, the insulation member interposed between the electrode assembly and the cap assembly and including a heat shrinkable material.

During shrinkage of the insulation member, the insulation member may shrink in a first direction, a second direction, a third direction and a fourth direction, which are centrally directed to the insulation member, shrinkage rates for the first direction and the second direction may be higher than those for the third direction and the fourth direction, the first direction and the second direction may be opposite to each other, the third direction and the fourth direction are opposite to each other, and the first direction and the second direction may be perpendicular to the third direction and the fourth direction.

In addition, during shrinkage of the insulation member, the insulation member may shrink in the first direction and the second direction to have a reduced planar area by at least 90% based on a total planar area of the insulation member and shrinks in the third direction and the fourth direction to have a reduced planar area by at least 10% based on the total planar area of the insulation member.

The insulation member may include at least one of a polyethylene terephthalate (PET) heat shrinkable film, a polypropylene (PP) heat shrinkable film, and an oriented polystyrene (OPS) heat shrinkable film.

In addition, the insulation member may have a thickness of 0.3 to 0.5 mm.

The insulation member may be melted at a temperature in the range of 145° C. to 152° C. to then shrink.

The insulation member may shrink by heat in a predetermined temperature range to have a reduced planar area by 10 to 90%.

The insulation member may further include an upper insulation member; and a lower insulation member interposed between the electrode assembly and a bottom part of the can, wherein the lower insulation member may include a heat shrinkable material and shrinks by heat in a predetermined temperature range to have a reduced planar area by 10 to 90%.

The insulation member may include at least one of a polyethylene terephthalate (PET) heat shrinkable film, a polypropylene (PP) heat shrinkable film, and an oriented polystyrene (OPS) heat shrinkable film.

As described above, when battery abnormality, such as an over-charge or internal short circuit, occurs, an insulation member interposed between an electrode assembly and a cap assembly is thermally shrunk, thereby securing a sufficiently large gas moving space, ultimately minimizing an increase in the cell temperature.

Additional aspects and/or advantages of the invention will be set forth in part in the description which follows and, in part, will be obvious from the description, or may be learned by practice of the invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1A:
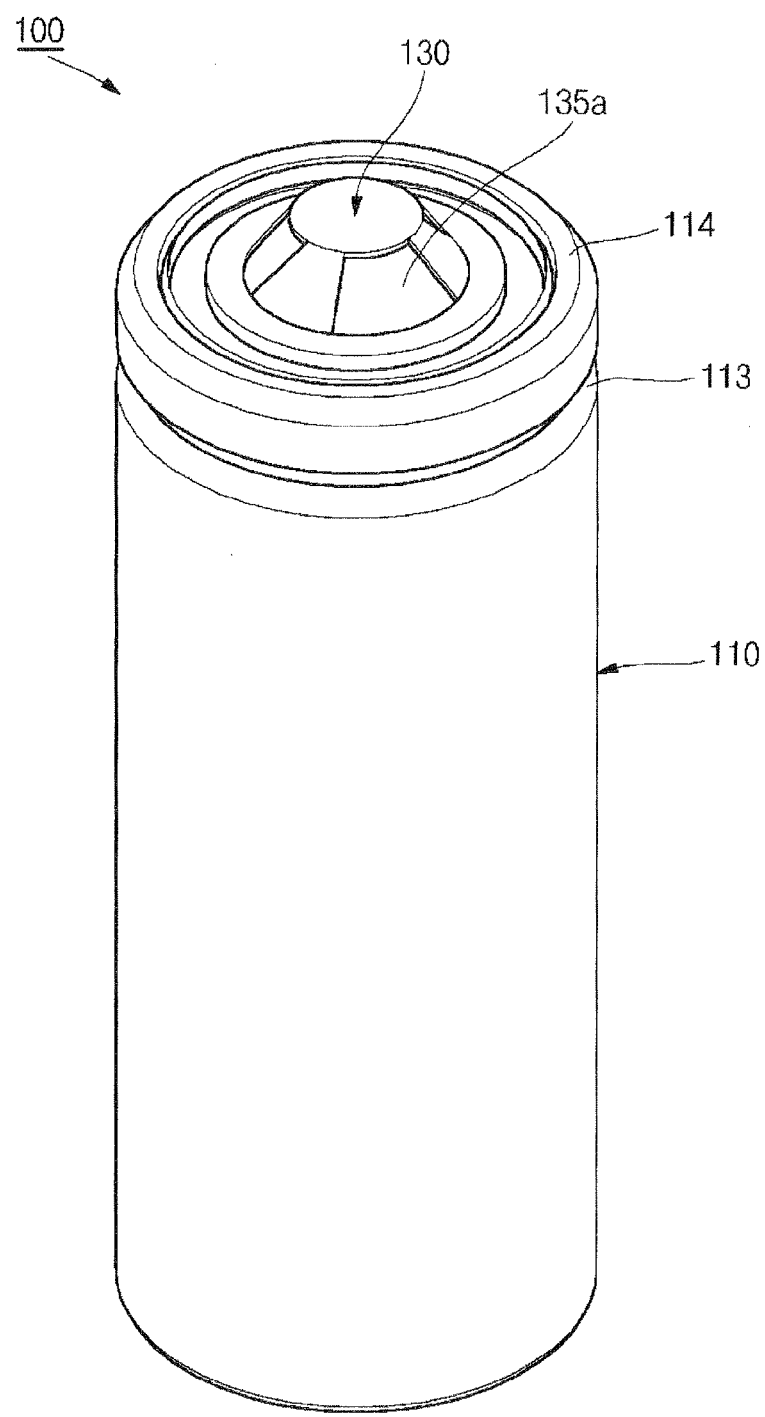
FIGS. 1A, 1B and 1C are a perspective view, a cross-sectional view and an exploded perspective view of a cylindrical lithium ion secondary battery according to an embodiment of the present invention.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, the present invention will be described with regard to a secondary battery, specifically a cylindrical lithium ion secondary battery, by way of example.

The lithium ion secondary batteries may generally be classified into cylindrical secondary batteries, prismatic secondary batteries, or pouch-type secondary batteries according to the depending on the shapes of an electrode assembly. The cylindrical lithium ion secondary battery may include a cylindrical electrode assembly, a cylindrical can coupled to the electrode assembly, an electrolytic solution injected into the can and allowing lithium ions to move, and a cap assembly coupled to one side of the can, preventing the electrolytic solution from leaking out and preventing the electrode assembly from being dislodged.

In general, a secondary battery may include a safety vent for discharging gases generated inside the can to the outside when a high temperature or a high pressure is generated due to battery abnormality due to over-charge or internal short circuit. An insulation plate is positioned between the cap assembly and the electrode assembly. Here, when battery abnormality occurs, as described above, the insulation plate may be exposed to high-temperature heat to be deformed or melted, thereby shutting down a gas discharge path. Accordingly, the internal temperature of the secondary battery rises higher and higher, thereby disabling the internal gas to be smoothly discharged to the outside.

Figure 1B:
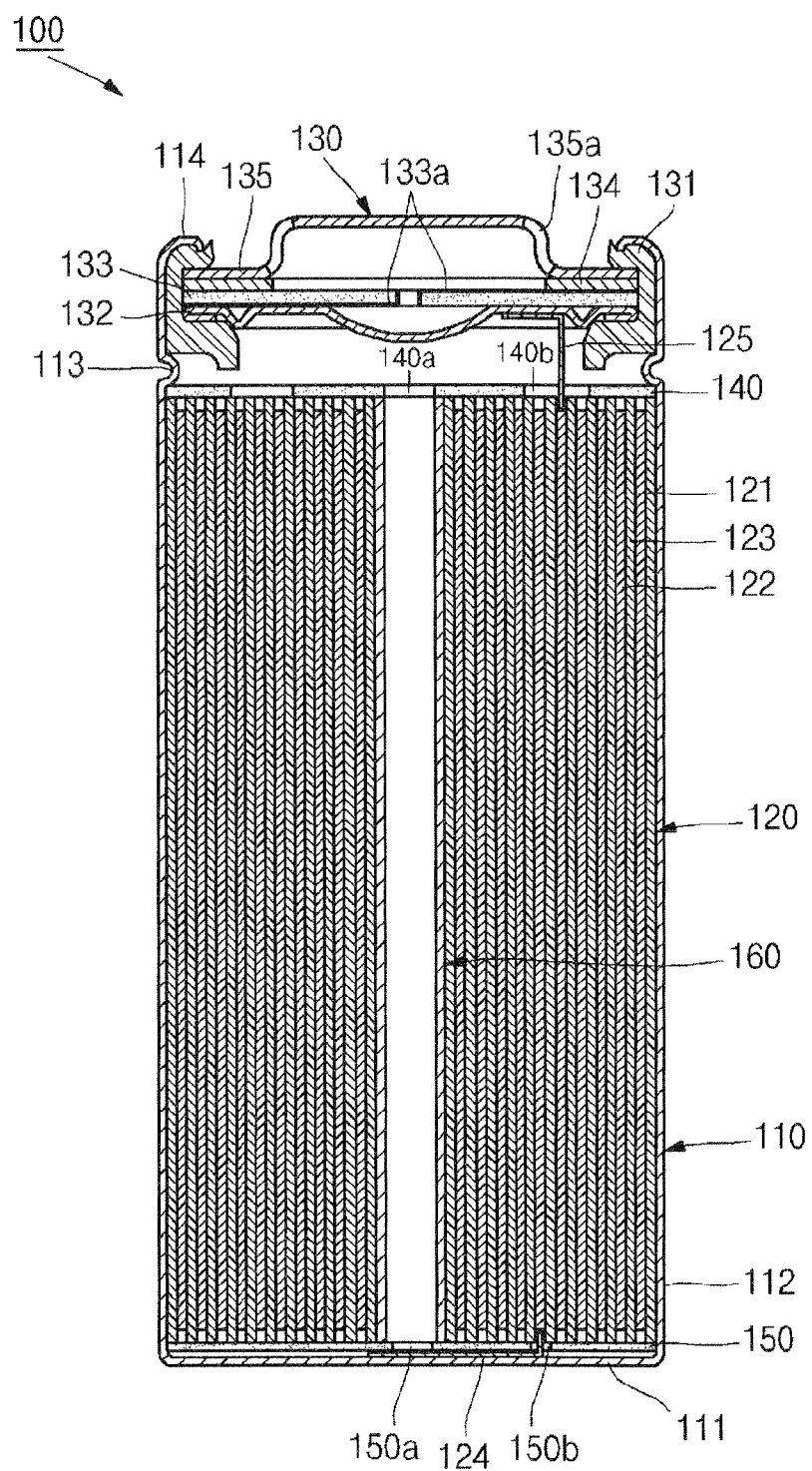
Figure 1C:
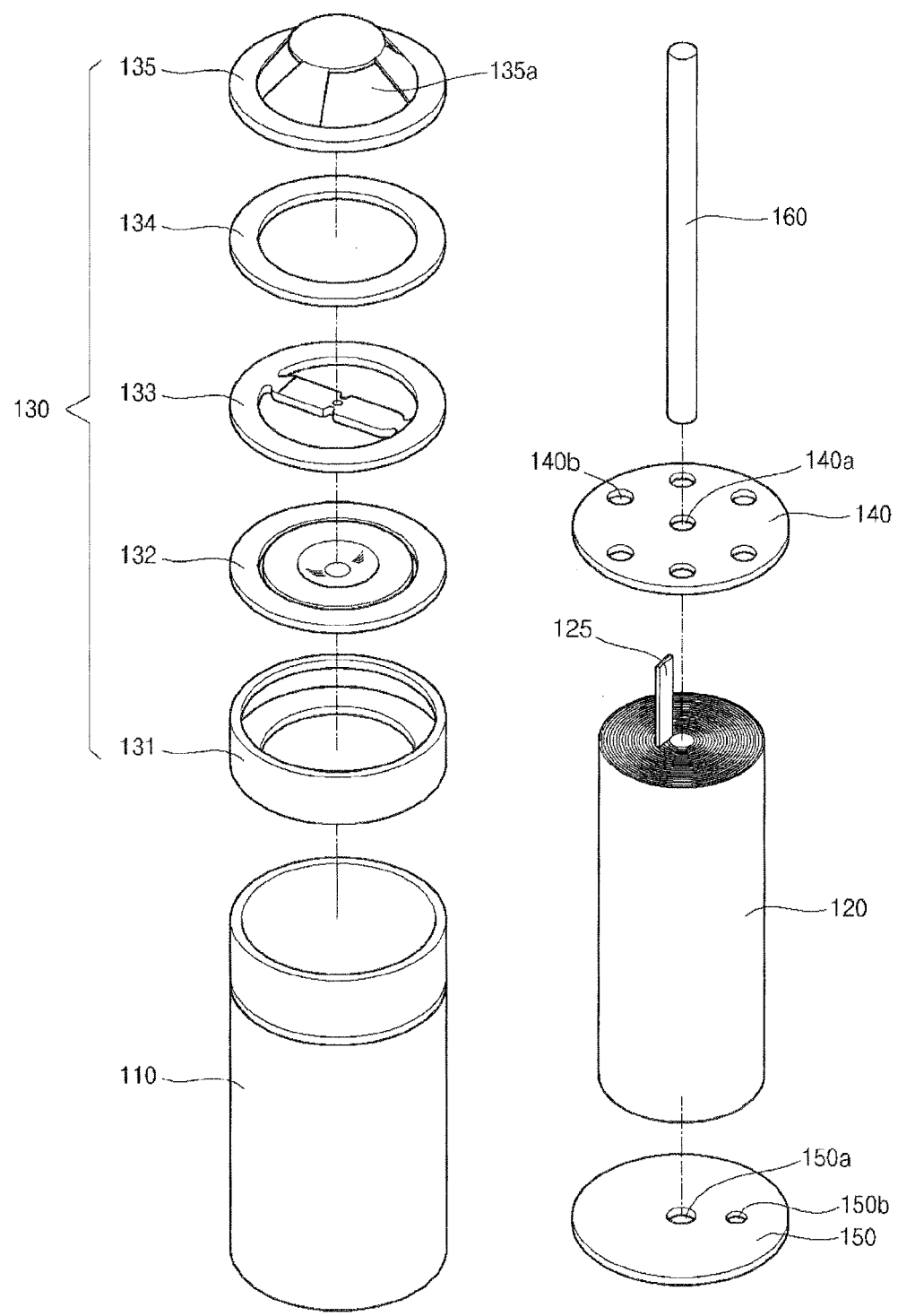

FIGS. 1A, 1B and 1C are a perspective view, a cross-sectional view and an exploded perspective view of a cylindrical lithium ion secondary battery according to an embodiment of the present invention.

As shown in FIGS. 1A to 1C, the cylindrical lithium ion secondary battery 100 according to an embodiment of the present invention may include a cylindrical can 110, an electrode assembly 120, a cap assembly 130 and an upper insulation member 140. In addition, the cylindrical lithium ion secondary battery 100 according to an embodiment of the present invention may further include a lower insulation member 150 and a center pin 160.

The cylindrical can 110 may include a circular bottom part 111 and a side part 112 upwardly extending a predetermined length from the bottom part 111. During fabrication of a secondary battery, a top portion of the cylindrical can 110 remains opened. Therefore, while the secondary battery is assembled, the electrode assembly 120 and the center pin 160 are inserted into the cylindrical can 110 together with an electrolytic solution. The cylindrical can 110 may be made of steel, stainless steel, aluminum, an aluminum alloy, or equivalents thereof, but aspects of the present invention are not limited thereto. In addition, the cylindrical can 110 may include an inwardly recessed beading part 113 formed under the cap assembly 130 so as to prevent the cap assembly 130 from being separated from the can 110 and an inwardly bent crimping part 114 formed at an upper portion of the can 110.

The electrode assembly 120 is accommodated in the cylindrical can 110 together with an electrolytic solution. The electrode assembly 120 may include a negative electrode plate 121 coated with a negative electrode active material (e.g., graphite or carbon), a positive electrode plate 122 coated with a positive electrode active material (e.g., a transition metal oxide such as $LiCoO_2$, $LiNiO_2$, or $LiMn_2O_4$), and a separator 123 located between the negative electrode plate 121 and the positive electrode plate 122 to prevent electrical short-circuits between the two plates and to allow for movement of only Li ions therethrough. The negative electrode plate 121, the positive electrode plate 122 and the separator 123 are wound in a substantially cylindrical shape. Here, the negative electrode plate 121 may be made of a copper (Cu) foil, the positive electrode plate 122 may be made of an aluminum (Al) foil, and the separator 123 may be made of polyethylene (PE) or polypropylene (PP), but aspects of the present invention are not limited thereto. In addition, a negative electrode tab 124 protruding a predetermined distance upward from the negative electrode plate 121 may be welded to the negative electrode plate 121. A positive electrode tab 125 protruding a predetermined distance downward from the positive electrode plate 122 may be welded to the positive electrode plate 122, or vice versa. In addition, the negative electrode tab 124 may be made of nickel (Ni), and the positive electrode tab 125 may be made of aluminum (Al), but aspects of the present invention are not limited thereto.

In addition, the negative electrode tab 124 of the electrode assembly 120 may be welded to the bottom part 111 of the cylindrical can 110. Therefore, the cylindrical can 110 may function as a negative electrode. On the contrary the positive electrode tab 125 may be welded to the bottom part 111 of the cylindrical can 110. In this case, the cylindrical can 110 may function as a positive electrode.

The cap assembly 130 may include an insulating gasket 131 coupled to an upper portion of the cylindrical can 110 (that is, to upper portions of the electrode assembly 120 and the center pin 160) in a substantially ring-like shape, and a conductive safety vent 132 coupled to the insulating gasket 131. Here, the positive electrode tab 125 may be connected to the safety vent 132. On the contrary, the negative electrode tab 124 may be connected to the safety vent 132. As well known in the art, the safety vent 132 deforms or may be ruptured when the internal pressure of the can 110, thereby destroying a printed circuit board (PCB) 133 to be described later or discharging gases to the outside. In addition, the PCB 133 to which current is interrupted from being applied when the safety vent 132 deforms may be positioned at an upper portion of the safety vent 132, and a positive temperature coefficient device 134 to which current is interrupted from being applied when an over-charge flows is positioned at an upper portion of the safety vent 132. A conductive positive electrode cap 135 (or negative electrode cap) having a plurality of throughholes 135a may be further provided at an upper portion of the positive temperature coefficient device 134 to supply a positive voltage (or a negative voltage) to an external circuit and to facilitate gas discharge. The safety vent 132, the PCB 133, the positive temperature coefficient device 134 and the positive electrode cap 135 are all mounted inside the insulating gasket 131, thereby preventing a direct short circuit to the cylindrical can 110. In addition, a wire pattern 133a may be formed on a surface of the PCB 133. The wire pattern 133a may be configured to be naturally broken when the PCB 133 is damaged or destroyed.

The upper insulation member 140 may have the shape of a circular plate and is coupled to the cylindrical can 110. The upper insulation member 140 may be interposed between a top end of the electrode assembly 120 and a bottom end of the cap assembly 130. A first hole 140a may be formed at the center of the upper insulation member 140, and a plurality of second holes s 140b are formed at outer sides of the first hole 140a. The upper insulation member 140 may be coupled to the cylindrical can 110 to fix the electrode assembly 120 and prevents the electrode assembly 120 from electrically contacting the cap assembly 140. In particular, the upper insulation member 140 prevents the negative electrode plate 121 of the electrode assembly 120 from electrically contacting the cap assembly 140. Here, when a large amount of gases are generated in the secondary battery due to an abnormal operation of the secondary battery, the first hole 140a serves to allow the gases to rapidly move to the cap assembly 130, and the positive electrode tab 125 penetrates through the second holes 140b to be welded to the cap assembly 140. In addition, during an electrolytic solution injection process, the remaining second holes 140b allow the electrolytic solution to rapidly flow into the electrode assembly 120.

In addition, when the internal temperature of the cylindrical can 110 reaches a predetermined temperature range, the upper insulation member 140 is melted to shrink and is configured such that a planar area of the upper insulation member 140 may be reduced by about 10 to 90%. The configuration of the upper insulation member 140 will later be described in more detail.

The lower insulation member 150 may be coupled to the cylindrical can 110 and may be interposed between the bottom end of the electrode assembly 120 and the bottom part 111 of the cylindrical can 110. A first hole 150a may be formed at the center of the lower insulation member 150, and a plurality of second holes s 150b are formed at outer sides of the first hole 150a. The lower insulation member 150 prevents the electrode assembly 120 from electrically contacting the bottom part 111 of the cap assembly 140. In particular, the lower insulation member 150 prevents the positive electrode plate 122 of the electrode assembly 120 from electrically contacting the bottom part 111 of the cap assembly 140. Here, when a large amount of gases are generated in the secondary battery due to an abnormal operation of the secondary battery, the first hole 150a serves to allow the gases to rapidly move to the cap assembly 130, and the negative electrode tab 124 penetrates through the second holes 150b to be welded to the bottom part 111 of the cap assembly 140.

In addition, diameters of the first holes 140a and 150a of the upper and lower insulation members 140 and 150 are smaller than or equal to a diameter of the center pin 160, thereby preventing the center pin 160 from electrically contacting the bottom part 111 of the cylindrical can 110 or the cap assembly 130 due to external shocks.

Meanwhile, the lower insulation member 150 may be configured to have the same property as the upper insulation member 140. For example, when the internal temperature of the cylindrical can 110 reaches a predetermined temperature range, the lower insulation member 150 is melted and shrinks to have a reduced planar area by about 10 to 90%. A more detailed configuration of the lower insulation member 150 will later be described with the upper insulation member 140.

The center pin 160 may have the shape of a hollow circular pipe and may be coupled to a roughly central portion of the electrode assembly 120. The center pin 160 may be made of steel, stainless steel, aluminum, an aluminum alloy, or polybutylene terephthalate, but aspects of the present invention are not limited thereto. The center pin 160 suppresses deformation of the electrode assembly 120 during charging and discharging of battery, and serves as a gas movement passage of gases generated from the secondary battery.

In addition, an electrolytic solution (not shown) is injected into the cylindrical can 110, functioning as a medium for moving lithium (Li) ions generated by an electrochemical reaction that occurs in the negative electrode plate 121 and the positive electrode plate 122 at charging/discharging times. The electrolytic solution may be a non-aqueous type organic electrolytic solution which is a mixture of a lithium salt and an organic solvent type with high purity. Further, the electrolytic solution may be a polymer using a polymer electrolyte, but the type of the electrolytic solution material is not limited thereto.

Hereinafter, configurations of the upper insulation member 140 and the lower insulation member 150 according to an embodiment of the present invention will be described in more detail.

The upper insulation member 140 basically has an insulating property and is preferably configured so as not to be affected by impregnation of electrolytic solution. For example, the upper insulation member 140 may be incapable of absorbing an electrolytic solution.

In addition, the upper insulation member 140 may include a heat shrinkable material, so that it may be melted to be shrinkable when it is exposed to heat. Table 1 shows various materials for forming a heat shrinkable film to describe standards of selecting a heat shrinkable material for forming the upper insulation member 140.

TABLE 1

| Kind of heat shrinkable film | Gas discharged from can | Reaction of electrolytic solution | Detection of detrimental material | Temperature (° C.) of can |
|---|---|---|---|---|
| PET | ○ | X | X | 145~152 |
| PP | ○ | X | X | 145~152 |
| OPS | ○ | ○ | X | 145~152 |
| PVC | ○ | X | ○ | 145~152 |
| PO | ○ | X | ○ | 145~152 |

Referring to Table 1, examples of the heat shrinkable film may include at least one of a polyethylene terephthalate (PET) heat shrinkable film, a polypropylene (PP) heat shrinkable film, an oriented polystyrene (OPS) heat shrinkable film, a polyvinyl chloride (PVC) heat shrinkable film and a polyolefin (PO) heat shrinkable film. The examples of the heat shrinkable film listed in Table 1 do not cover all of heat shrinkable films but are provided by way of example of description of standards for selecting a heat shrinkable film useful as the upper insulation member 140 according to the embodiment of the present invention.

In table 1, the phrase "Gas discharged from can" is used to mean that a heat shrinkable film is melted and shrinks when the temperature of the can rises to a predetermined temperature (for example, 142 to 152° C.) or higher, providing an open space between the electrode assembly 120 and the cap assembly 130, and gases generated from the electrode assembly 120 are discharged to the outside through the open space and the cap assembly 130. Here, the gas discharged from the can indicates whether the heat shrinkable film has an appropriate shrinkage rate. More specifically, the gas discharged from the can indicates whether the open space between the electrode assembly 120 and the cap assembly 130 due to shrinkage of the heat shrinkable film is sufficiently large or not. Therefore, referring to "Gas discharged from can" shown in Table 1, all of the PET heat shrinkable film, the PP heat shrinkable film, the OPS heat shrinkable film, the PVC heat shrinkable film and the PO heat shrinkable film have appropriate shrinkage rates.

Next, referring to "Reaction of electrolytic solution" shown in Table 1, only the OPS heat shrinkable film reacts with an electrolytic solution. However, the reaction taking place between the OPS heat shrinkable film and the electrolytic solution means a reaction in which the OPS heat shrinkable film undergoes a barely noticeable deformation, rather than a reaction in which a change in the shrinkage rate of the OPS heat shrinkable film or an abnormal operation of battery may be caused, so that the OPS heat shrinkable film serving as the upper insulation member 140 is not affected by the reaction of electrolytic solution.

Referring to "Detection of detrimental material" shown in Table 1, detrimental materials are detected from the PVC and PO heat shrinkable films. In particular, the PVC heat shrinkable film is melted at a predetermined temperature or higher and emits an environmentally detrimental material, such as dioxin. Meanwhile, the PO heat shrinkable film has another disadvantage in that its cost may be higher than that of the PET, PP or OPS heat shrinkable film.

Therefore, the upper insulation member 140 of the present embodiment preferably may include at least one of the PET, PP and OPS heat shrinkable films, except for the PVC and PO heat shrinkable films, from which detrimental materials are detected and which are expensive.

A method of fabricating the heat shrinkable film will now be briefly described. For example, in a case of a PET heat shrinkable film, a plasticizer may be first added to a PET source material to prepare a molten resin of high temperature and then molded in a desired form (e.g., in an insulation plate form) using a mold. Thereafter, the insulation plate may be taken out of the mold and elongated in horizontal and vertical directions. In this state, radiation is irradiated to the elongated insulation plate. Then, the insulation plate may be crosslinked in the elongated state and may be punched to form holes, if necessary, thereby completing the upper insulation member 140. The thus fabricated upper insulation member 140 is melted at a temperature of about 145 to 152° C. and then shrinks to have a size similar to its original size. However, the heat shrinking temperature and the shrinkage rate of the heat shrinkable film can be adjusted by appropriately adjusting parameters of the fabrication process. For example, the heat shrinking temperature and the shrinkage rate of the heat shrinkable film can be adjusted by appropriately adjusting an amount of plasticizer, an elongation ratio, radiation intensity, or the like.

When a high temperature or high pressure occurs to the secondary battery 100 due to the abnormal operation of battery, such as over-charge or internal short circuit, the upper insulation member 140 formed of the heat shrinkable film is melted by high-temperature heat and shrinks to have a reduced planar area. Here, the upper insulation member 140 is preferably melted by heat of a relatively high temperature to be thermally shrunk. For example, the upper insulation member 140 may be melted at about 145 to 152° C. to shrink. The upper insulation member 140 is more preferably melted at about 150° C. to shrink. The reason of the foregoing is as follows. That is to say, if the upper insulation member 140 shrinks at a relatively low temperature, it is melted and shrinks during a cell formation process (e.g., about 60° C.), and there may be a high probability of damages occurring to the upper insulation member 140. Therefore, when battery abnormality, such as over-charge or internal short circuit, occurs, the upper insulation member 140 may be appropriately adjusted at a temperature of about 145° C. to 152° C.

When the upper insulation member 140 is thermally shrunk, a thickness of the upper insulation member 140 may increase. For example, before melting, the upper insulation member 140 may have a thickness of about 0.3 to 0.5 mm. After shrinking by heat, the upper insulation member 140 may have a thickness of about 0.5 to 0.78 mm.

Figure 2A:
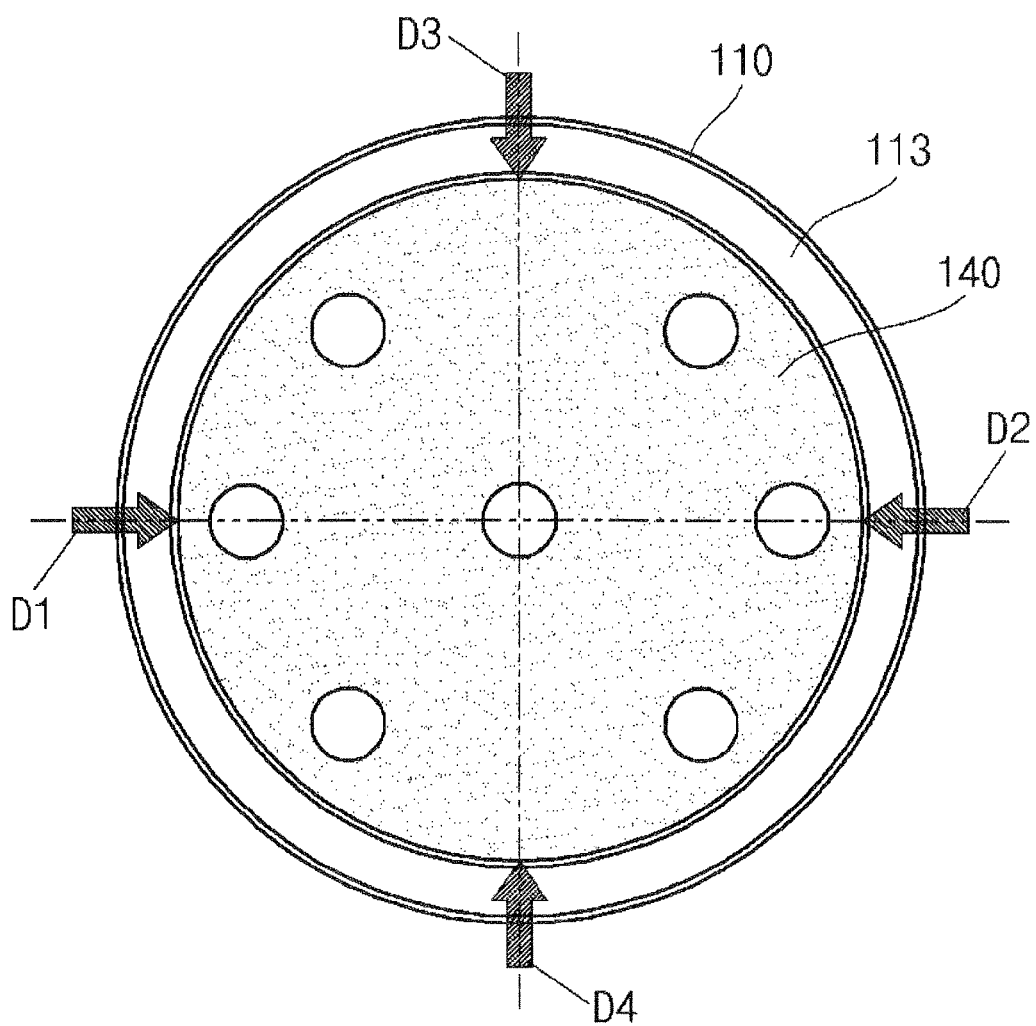
FIG. 2A is a plan view illustrating an upper insulation member according to an embodiment of the present invention and its shrinkage direction.
Figure 2B:
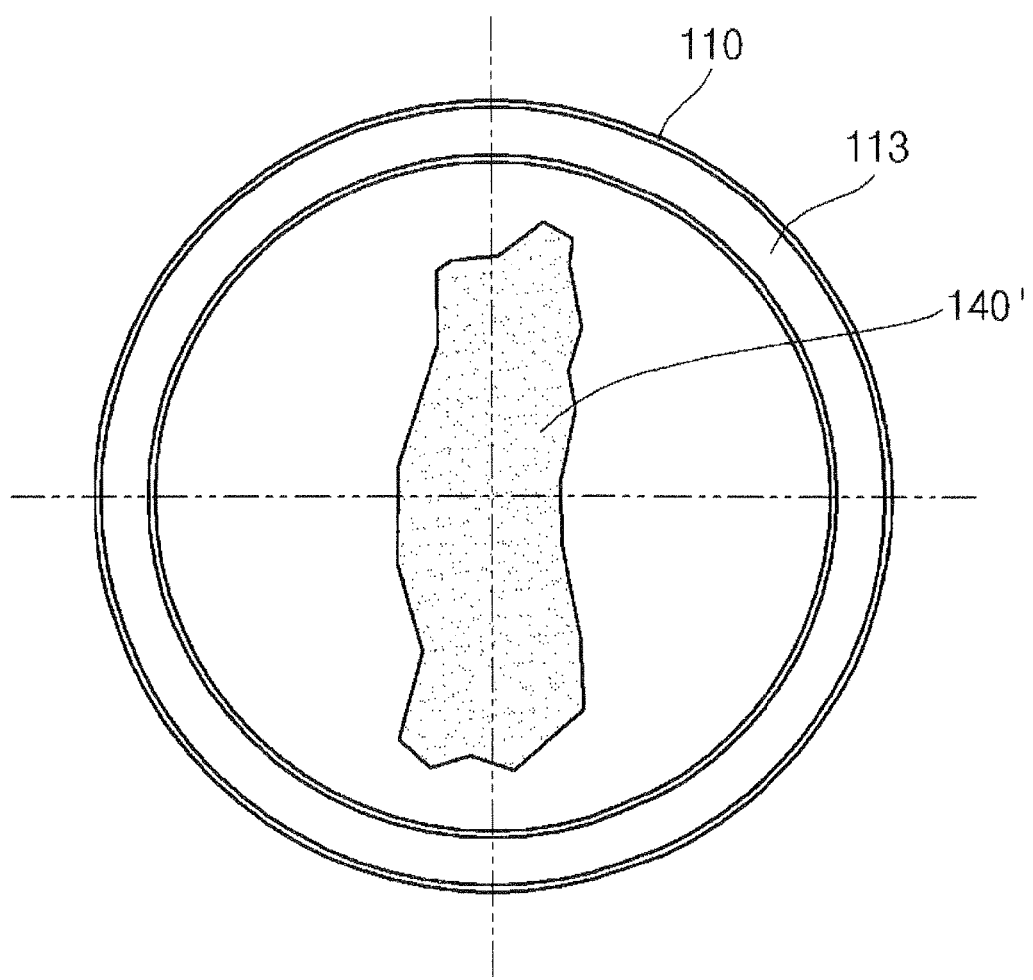
FIG. 2B is a top view illustrating a thermally shrunk form of the upper insulation member shown in FIG. 2A.

FIG. 2A is a plan view illustrating an upper insulation member (140) according to an embodiment of the present invention and its shrinkage direction, and FIG. 2B is a top view illustrating a thermally shrunk form (140') of the upper insulation member shown in FIG. 2A.

When the upper insulation member 140 shrinks by heat, it may shrink with directionality. For example, as shown in FIG. 2A, the upper insulation member 140 may shrink in first to fourth directions D1, D2, D3 and D4. Here, the first direction D1 may be opposite to the second direction D2, and the third direction D3 may be opposite to the fourth direction D4. The first direction D1 and the second direction D2 may be perpendicular to the third direction D3 and the fourth direction D4, respectively.

When the upper insulation member 140 shrinks by heat, it may have a reduced planar area. Planar area reduction extents of the upper insulation member 140 may differ depending on the shrinking direction. For example, shrinkage rates for the first direction D1 and the second direction D2 may be higher than those for the third direction D3 and the fourth direction D4. On the contrary, shrinkage rates for the third direction D3 and the fourth direction D4 may be higher than those for the first direction D1 and the second direction D2. In the following description, the embodiment of the present invention will be described with regard to a case where the shrinkage rates for the first direction D1 and the second direction D2 are higher than those for the third direction D3 and the fourth direction D4.

More specifically, while the upper insulation member 140 shrinks in the first and second directions D1 and D2, at least 90% of a total planar area of the upper insulation member 140 may be reduced. While the upper insulation member 140 shrinks in the third and fourth directions D3 and D4, 10% of the planar area of the upper insulation member 140 having a 90% reduced planar area may be reduced. Here, there is no time difference between when the insulation member 140 shrinks in the first and second directions D1 and D2 and when the insulation member 140 shrinks in the third and fourth directions D3 and D4, and shrinkage of the insulation member 140 occurs simultaneously in the four directions. However, the above description is provided only for illustrating that the planar area reduction extents of the upper insulation member 140 differ depending on the shrinking direction, but the shrinking direction matters little to the shrinkage order.

If the upper insulation member 140 shown in FIG. 2 shrinks, the upper insulation member 140' has a reduced planar area, as shown in FIG. 2B. The planar area of the upper insulation member 140 may be reduced in the above-described manner according to the shrinking direction, but aspects of the present invention are not limited thereto. When the upper insulation member 140 using a heat shrinkable film shrinks in the temperature range stated above, it may have a reduced planar area by about 10 to 90%. However, in order to ensure some reliability of the upper insulation member 140, the upper insulation member 140 may be preferably configured to have a shrinkage rate of about 50%. When the upper insulation member 140 shrinks by heat of a high temperature due to the abnormal operation of battery, such as an over-charge or internal short circuit, a reduction of less than 50% in the planar area of the upper insulation member 140 may make it difficult to secure a sufficiently large open space between the electrode assembly 120 and the cap assembly 130. Therefore, gases may not be able to move smoothly from the electrode assembly 120 to the cap assembly 130. Accordingly, the internal temperature of battery may further rise to a higher temperature. However, in a case where the upper insulation member 140 of the present embodiment may be configured to have a shrinkage rate of 50% or higher, a sufficiently large space for gas movement between the electrode assembly 120 and the cap assembly 130 can be ensured, and the gases may move more smoothly and rapidly from the electrode assembly 120 to the cap assembly 130. Therefore, it is possible to maximally prevent the internal temperature of battery from rising.

Meanwhile, the upper insulation member 140 melted by heat preferably has no or little adhesiveness.

The lower insulation member 150 may be configured to include a heat shrinkable film and to have the same physical and chemical properties as the upper insulation member 150. Accordingly, the lower insulation member 150 may perform substantially the same function as the upper insulation member 150. Since the lower insulation member 150 has a substantially the same configuration as the upper insulation member 150, a detailed description thereof will not be repeated. However, in a case where the lower insulation member 150 may include a safety vent (not shown) provided at a bottom part of the can 110, it may be configured in the same manner as the upper insulation member 140. The safety vent may be thinner than the bottom part of the can 110 and may be ruptured when the internal pressure of the can 110 abnormally increases to allow some of the gases generated from the can 110 to be discharged to the outside through the ruptured safety vent. Therefore, when the lower insulation member 150 has the same properties as the upper insulation member 140, the safety vent (not shown) may be preferably provided at the bottom part of the can 110, which is advantageous in view of gas discharge efficiency. That is to say, when the internal temperature of the can 110 rises to reach a predetermined temperature range (about 142 to 152° C.), the lower insulation member 150 shrinks to secure a sufficiently large open space between a bottom end of the electrode assembly 120 and the bottom part of the can 110, thereby allowing some of the gases generated from the can 110 to the outside through the safety vent.

Figure 3A:
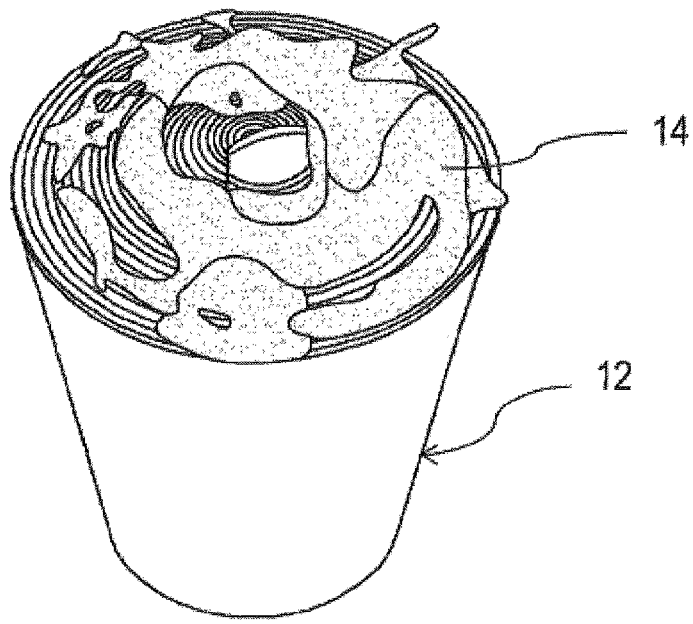
FIG. 3A and FIG. 3B are perspective views illustrating a conventional upper insulation member melted by heat and an upper insulation member thermally shrunk according to an embodiment of the present invention and its shrinkage direction.
Figure 3B:
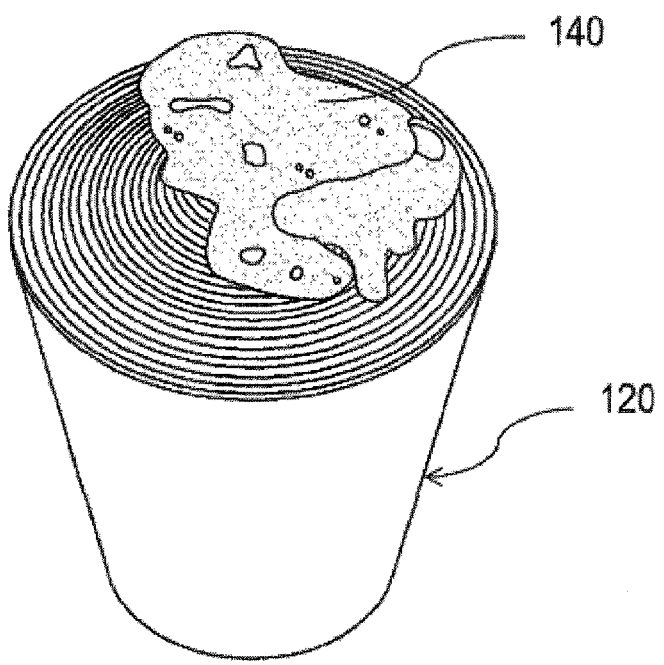

FIG. 3A and FIG. 3B are perspective views illustrating a conventional upper insulation member 140 melted by heat and an upper insulation member 140 thermally shrunk according to an embodiment of the present invention and its shrinkage direction.

FIG. 3A shows the conventional upper insulation member 14 melted by heat and the melted upper insulation member closes most parts of a top end of the electrode assembly 12. In this case, as described above, the passage of gases moving from the electrode assembly to the cap assembly may be blocked to further increase the internal temperature of battery.

FIG. 3B shows a thermally shrunk upper insulation member according to an embodiment of the present invention, in which the upper insulation member may be considerably shrunk to open most parts of a top end of the electrode assembly. In this case, gases may be able to move smoothly from an electrode assembly 120 to a cap assembly 130. Accordingly, it is possible to minimize an increase in the internal temperature of battery.

In a case where abnormality, such as an over-charge or internal short circuit occurs to the conventional secondary, the upper insulation member provided between the cap assembly 130 and the electrode assembly 120 may be broken or melted by heat of a high temperature, covering the top end of the electrode assembly 120. In this case, a gas discharge passage from the electrode assembly 120 to the cap assembly 130 may be blocked, thereby further increasing the internal temperature of battery.

However, according to one embodiment, the upper insulation member 140 may be configured to have a planar area reduced by 50% or greater to secure a sufficiently large space for gas movement between the electrode assembly 120 and the cap assembly 130, thereby allowing the gases to more smoothly move from the electrode assembly 120 to the cap assembly 130. Accordingly, it is possible to minimize an increase in the internal temperature of battery.

While the cylindrical lithium ion secondary battery of this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims. For example, it is obvious that the present invention is applied to not only the cylindrical lithium ion secondary battery but also a prismatic or pouch-type lithium ion secondary battery.

What is claimed is:

1. A secondary battery comprising:
a can;
an electrode assembly accommodated in the can together with an electrolytic solution;
a cap assembly sealing the can; and
an insulation member interposed between the electrode assembly and the cap assembly, the insulation member is contained within the can and in direct physical contact with an end of the electrode assembly,
wherein the insulation member is composed of a heat shrinkable material that shrinks in a temperature range of 145° C. to 152° C. to have a reduced planar area of between 10% to 90% of a total area of the insulation material, said heat shrinkable material consists of either polypropylene or oriented polystyrene.

2. The secondary battery of claim 1, wherein during shrinkage of the insulation member, the insulation member shrinks in a first direction, a second direction, a third direction and a fourth direction, which are centrally directed to the insulation member, shrinkage rates for the first direction and the second direction are higher than those for the third direction and the fourth direction, the first direction and the second direction are opposite to each other, the third direction and the fourth direction are opposite to each other, and the first direction and the second direction are perpendicular to the third direction and the fourth direction.

3. The secondary battery of claim 2, wherein during shrinkage of the insulation member, the insulation member shrinks in the first direction and the second direction to have a reduced planar area by at least 90% based on a total planar area of the insulation member and shrinks in the third direction and the fourth direction to have a reduced planar area by at least 10% of a planar area based on the total planar area of the insulation member.

4. The secondary battery of claim 1, wherein the insulation member has a thickness of 0.3 to 0.5 mm.

5. The secondary battery of claim 1, wherein the insulation member is an upper insulation member, a lower insulation member is further provided between the electrode assembly and a bottom part of the can, the lower insulation member made of a heat shrinkable material and shrinking by heat in a predetermined temperature range to have a reduced planar area by 10 to 90%.

6. The secondary battery of claim 5, wherein the lower insulation member includes at least one of a polyethylene terephthalate heat shrinkable film, a polypropylene heat shrinkable film, and an oriented polystyrene heat shrinkable film.

7. The secondary battery of claim 1, which is a cylindrical secondary battery.

8. An insulation member comprising:
a can; and
an electrode assembly accommodated in the can together with an electrolytic solution and a cap assembly sealing the can, the insulation member interposed between the electrode assembly and the cap assembly and including a heat shrinkable material,
wherein the insulation member is contained within the can and in direct physical contact with one end of the electrode assembly,
wherein the insulation member is composed of a heat shrinkable material that shrinks in a temperature range of 145° C. to 152° C. to have a reduced planar area of between 10% to 90% of a total area of the insulation material, said heat shrinkable material is composed of either polypropylene or oriented polystyrene.

9. The insulation member of claim 8, wherein during shrinkage of the insulation member, the insulation member shrinks in a first direction, a second direction, a third direction and a fourth direction, which are centrally directed to the insulation member, shrinkage rates for the first direction and the second direction are higher than those for the third direction and the fourth direction, the first direction and the second direction are opposite to each other, the third direction and the fourth direction are opposite to each other, and the first direction and the second direction are perpendicular to the third direction and the fourth direction.

10. The insulation member of claim 9, wherein during shrinkage of the insulation member, the insulation member shrinks in the first direction and the second direction to have a reduced planar area at least 90% of a based on a total planar area of the insulation member and shrinks in the third direction and the fourth direction to have a reduced at least 10% of based on the total planar area of the insulation member.

11. The insulation member of claim 8, which has a thickness of 0.3 to 0.5 mm.

12. The insulation member of claim 8, further comprising:
an upper insulation member; and
a lower insulation member interposed between the electrode assembly and a bottom part of the can,
wherein the lower insulation member includes a heat shrinkable material and shrinks by heat in a predetermined temperature range of 145°C. to 152C. to have a reduced planar area by 10 to 90%, said heat shrinkable material is composed of either polypropylene or an oriented polystyrene.

\* \* \* \* \*